Aug. 8, 1950   J. MORKOSKI   2,518,360
AGRICULTURAL IMPLEMENT
Filed Oct. 5, 1946   2 Sheets-Sheet 1
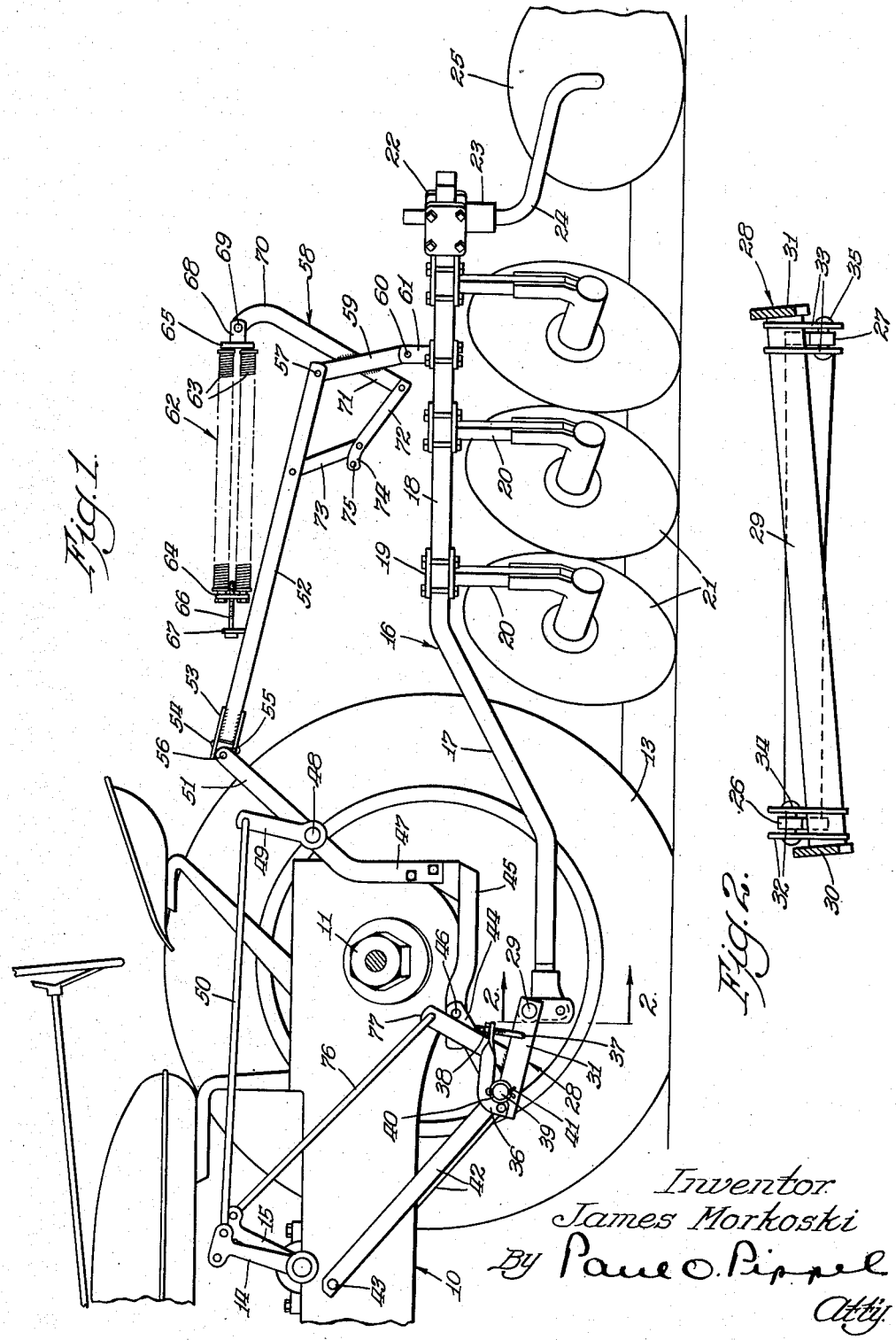
Inventor
James Morkoski
By Paul O. Pippel
Atty.

Aug. 8, 1950   J. MORKOSKI   2,518,360
AGRICULTURAL IMPLEMENT
Filed Oct. 5, 1946   2 Sheets-Sheet 2

Inventor
James Morkoski
By Paul O. Pippel
Atty.

Patented Aug. 8, 1950

2,518,360

UNITED STATES PATENT OFFICE 2,518,360

AGRICULTURAL IMPLEMENT

James Morkoski, Canton, Ill., assignor to International Harvester Company, a corporation of New Jersey Application October 5, 1946, Serial No. 701,548

8 Claims. (Cl. 97—47)

This invention relates to agricultural implements, and particularly to an implement adapted to be connected to a tractor and propelled thereby. Specifically, the invention concerns a tractor mounted implement of the disk tillage type and means for controlling the operation thereof.

An object of the invention is to provide a disk tillage implement such as a plow adapted to be connected to and controlled from a tractor and to be mounted thereupon.

Another object of the invention is to provide in a tractor mounted disk plow or the like improved means for controlling the depth of operation thereof.

Another object of the invention is to provide in a tractor connected disk plow or the like, improved means for maintaining constant pressure on the earth working tools so that they will plow uniformly when traveling over uneven ground.

A further object of the invention is to provide in a tractor connected implement, means deriving power from the tractor for adjusting the pressure upon the disks of a disk tillage implement such as a plow, harrow or the like to cause them to penetrate the soil at a uniform depth, particularly when traveling over uneven ground.

Other objects and advantages of the invention will become apparent from the following detailed description when read in conjunction with the accompanying drawings, wherein:

Figure 1 is a view in side elevation showing an implement embodying the features of the present invention connected to a tractor;

Figure 2 is a section on the line 2—2 of Figure 1; and

Figure 3:
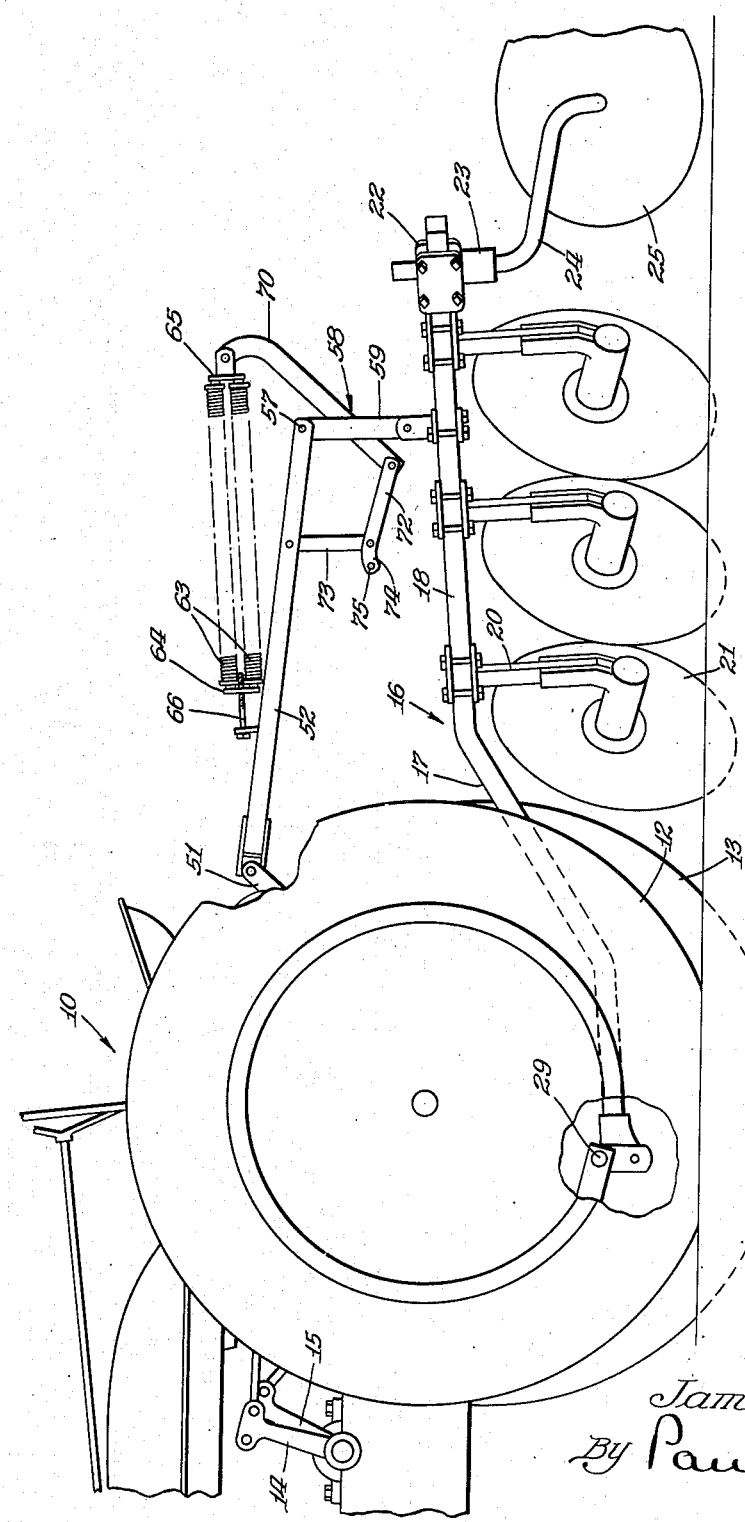
Figure 3 is a view similar to Figure 1 showing the position of the implement when rising in response of variations in ground contour or upon encountering obstructions.

The implement of the present invention is a disk plow and is illustrated as mounted upon a tractor 10 having a transverse rear axle structure 11 and rear drive wheels 12 and 13, one of which is shown removed in Figure 1 in order to more clearly illustrate the connection of the implement to the tractor. Tractor 10 is preferably provided with hydraulic power mechanism not shown operated by the tractor power plant and adapted to independently rock a pair of rock arms 14 and 15 mounted upon the tractor which are adapted to function in a manner which will hereinafter become clear.

The disk plow of the present invention comprises a conventional frame 16 including a hitch portion 17 extending longitudinally of the tractor and a tool supporting portion 18 extending rearwardly and diagonally of the direction of travel. Frame 16 is provided with a number of brackets 19 for securing to the frame a number of vertically extending standards 20 supporting at their lower ends earth working disks 21.

The rear end of the frame 16 has secured thereto a bracket 22 provided with a vertically extending bearing 23 adapted to receive for vertical adjustment thereon an axle 24 which is bent rearwardly and outwardly and has mounted thereupon a rear furrow wheel 25. Rear furrow wheel 25 is adapted to ride at an angle with respect to the vertical and to dig into the wall of the furrow formed by the earth working disks 21 and offset side draft upon the earth working disks.

The hitch portion 17 of the frame 16 is forked to provide laterally spaced longitudinally extending beams 26 and 27 adapted for connection to a stabilizing hitch structure 28 (see Figure 2). Hitch structure 28 is generally U-shaped and comprises a transverse bar 29 and forwardly extending arms 30 and 31 at opposite ends of the bar 29.

At opposite ends of the bar 29 are secured laterally spaced radially projected pairs of lugs 32 and 33. In Figure 2 it will be noted that the lugs 32 at one end of the bar 29 extend upwardly and the lugs 33 at the other end thereof extend downwardly. The pairs of lugs 32 and 33 are provided with pivot pins 34 and 35 respectively adapted to be received in openings in the ends of the beams 26 and 27 of the implement frame. The implement is thus capable of vertical swinging movement about the pivot pins 34 and 35 and by virtue of the positions of the lugs 32 and 33 and the connection of the implement frame thereto the implement is simultaneously stabilized against lateral tilting and held in its proper plowing position when the tractor is tilted due to one of the wheels thereof traveling in a furrow.

The forward end of each of the arms 30 and 31 of the structure 28 has pivoted thereto an L-shaped arm 36 having an opening in the end thereof to receive a bolt 37 connected to the arm 30 or 31 and threaded at its other end to receive a nut 38. The forward end of each of the arms 30 and 31 is notched to fit a transversely extending shaft 39, each end of which is provided with a washer 40 and a cotter pin 41 to prevent displacement thereof with respect to the hitch structure 28. The arm 36 is adapted to engage the shaft 39 and by tightening the nut 38 on the bolt 37 the hitch structure 28 is firmly, but quick-detachably secured to the transverse shaft 39. Shaft 39 is affixed to the end of a strap 42 which is secured at its other end by a bolt 43 to the tractor body, a similar strap being provided at each end of the shaft 39. Likewise secured adjacent each end of the shaft 39 is a strap 44 which extends rearwardly and upwardly and is secured to an attaching structure 45 by a bolt 46.

The disk plow of the present invention is adapted to be transported upon the tractor and is vertically moved between operating and transport positions by a lifting mechanism now to be described. An upstanding bracket 47 is provided at each side of the tractor body and secured to the rear portion of the attaching structure 45. The upper ends of the brackets 47 are apertured to receive for rocking movement the ends of a transverse shaft 48. The end of shaft 48 at the left hand side of the tractor has mounted thereupon a rock arm 49 which is connected by a rod 50 with the rock arm 14 mounted upon the tractor body.

Near the center of the shaft 48 there is secured an upwardly and rearwardly extending lift arm 51. Thus rocking of the power lift arm 14 acts through rod 50, arm 49, and shaft 48 to swing the lift arm 51 generally longitudinally.

A link 52 forming a part of the power lift structure by which the implement is moved between operating and transport positions is provided at its forward end with a clevis 53 which is connected by a vertical pivot pin 54 with a swivel 55 pivoted upon a transverse pin 56 mounted at the end of the lift arm 51. The rear end of link 52 is pivotally connected at 57 to a bell-crank 58 having a downwardly extending arm 59 pivoted at 60 upon a lug 61 secured to the implement frame 16 near the rear end thereof. Thus link 52 and bell-crank 58 form the lifting connection between lift arm 51 and implement frame 16 so that upon forward swinging of the lift arm 51 the implement will be pivoted about its connection to the hitch structure 28.

In a disk implement of the type described it is important that a constant pressure be applied against the implement to hold the earth working tools in the ground. It is important that this pressure be uniform and that the tendency of the implement to move upwardly relative to the tractor when operating over uneven ground or when encountering obstructions should be resiliently opposed. Spring pressure means 62 is therefore provided comprising a plurality of springs 63 connected at opposite ends to plates 64 and 65. Plate 64 is provided with an aperture threaded to receive the threaded end of a bolt 66, the neck of which is slidably received in an opening in a lug 67 affixed to and projecting upwardly from the link 52. Plate 65 at the other end of the springs has secured thereto a lug 68 pivotally connected at 69 to upwardly extending arm 70 of the bell-crank 58.

When the disk plow is in operating position as indicated in Figure 1, the lift arm 51 is held rigid and the implement is able to float vertically with respect to the tractor by swinging upwardly about its pivotal connection to the hitch structure 28. The link 52 is likewise capable of vertical swinging movement about its pivotal connection at 56 to the lift arm 51. When uneven ground or an obstruction is encountered by the disk plow it will swing upwardly about its pivotal connection to the hitch frame 28 to a position similar to that indicated in Figure 3. Due to the difference in arcs described by the link 52 and the plow frame 16 about their respective pivots upon the tractor, the arm 59 of the bell-crank 58 will approach a vertical position, the bell-crank 58 rocking in a clockwise direction as viewed in the drawings from the position shown in Figure 1 to the position shown in Figure 3. The rocking of the bell-crank extends the springs 63 and resists the upward movement of the plow. Thus in normal operation the plow is held to its work by the action of the extension springs 63. The tension of the springs may be increased or decreased as desired by manipulation of the threaded bolt 66.

Arm 70 of the bell-crank 58 is provided in the end opposite pivot 69 with an extension 71 which is connected by a link 72 to a link 73 pivoted at its other end upon the link 52. Links 72 and 73 thus form a toggle connection between the bell-crank 58 and link 52, and link 72 is provided with an extension 74 having a stop 75 at its end. In normal operating position of the disk plow as shown in Figures 1 and 3, the articulation of the links 72 and 73 accommodates vertical swinging movement of the plow frame with respect to the tractor and with respect to the lifting structure. However, upon actuating the rock arm 14 on the tractor to swing upwardly the lift arm 51, the links 72 and 73 approach a position in substantial alignment and the stop 75 engages the lower edge of the link 73 to make the lifting linkage rigid.

The depth of operation of a tractor mounted plow is influenced by the height of the hitch point of the plow beam above the ground. The hitch point of the plow of the present invention may be elevated or depressed by mechanism including a link 76 connecting rock arm 15 on the tractor to an arm 77 affixed to arm 31 of the hitch structure 28. Rock arm 15 is independently actuated by the hydraulic power mechanism previously mentioned, and operation thereof pivots the hitch structure 28 generally vertically about the shaft 39 to raise and lower the points of connection of the plow thereto.

It is believed that the operation of the tractor mounted disk plow of the present invention will be clearly understood from the foregoing description. It should likewise be understood, however, that various modifications may be made in the arrangement of parts without departing from the spirit of the invention or the scope of the appended claims.

What is claimed is:

1. Lift mechanism adapted for use with an agricultural implement connected to a tractor at its hitch point for lateral and vertical swinging movement, comprising a rockable structure on the tractor, means deriving power from the tractor to rock the rockable structure, and lifting means connecting the rockable structure and the implement to raise the latter to transport position on the tractor comprising a lift link pivotally connected to the rockable structure for lateral swinging movement and extending rearwardly therefrom, means serving as a bell-crank pivoted to the lift link on a transverse axis, said crank having a depending arm pivoted to the implement and a second arm extending above the pivotal connection of the crank to the lift link, and an extension spring connecting the said second arm to the lift link at a location spaced from the latter's connection to the crank.

2. Lift mechanism adapted for use with an agricultural implement connected to a tractor at its hitch point for lateral and vertical swinging movement, comprising a rockable structure on the tractor, means deriving power from the tractor to rock the rockable structure, and lifting means connecting the rockable structure and the implement to raise the latter to transport position on the tractor comprising a lift link pivotally connected to the rockable structure for lateral swinging movement and extending rearwardly therefrom, means serving as a bell-crank pivoted to the lift link on a transverse axis, said crank having an arm pivoted to the implement and another arm, and an extension spring connecting the other arm to the lift link at a location spaced from the latter's connection to the crank and operative upon extension thereof to urge the implement into the ground, said crank arms being so arranged with respect to the implement and the lift link, that upward movement of the implement rocks the crank in a direction to increase the tension upon the spring.

3. Lift mechanism adapted for use with an agricultural implement connected to a tractor at its hitch point for lateral and vertical swinging movement, comprising a rockable structure on the tractor, means for rocking the rockable structure, means connecting the rockable structure to the implement at a location spaced from said hitch point to move the implement between operating and transport positions, comprising a link pivotally connected to the rockable structure and extending rearwardly therefrom, means serving as a bell-crank pivoted to the link, said crank having an arm pivoted to the implement and another arm, and a spring connecting the other arm to the link at a location spaced from the latter's connection to the crank, said crank arms being so arranged with respect to the implement and the link that upward movement of the implement relative to the tractor rocks the crank in a direction to increase the tension upon the spring.

4. Lift mechanism adapted for use with an agricultural implement connected to a tractor at its hitch point for lateral and vertical swinging movement, comprising a link pivotally connected to the tractor for lateral swinging, means serving as a bell-crank pivoted adjacent the other end of the link, said crank having an arm pivoted to the implement and another arm, and an extension spring connecting the other arm to the link at a location spaced from the latter's connection to the crank, said crank arms being so arranged with respect to the implement and the link that upward movement of the implement relative to the tractor rocks the crank in a direction to increase the tension upon the spring.

5. Lift mechanism adapted for use with an agricultural implement connected to a tractor at its hitch point for lateral and vertical swinging movement, comprising a link pivotally connected to the tractor for lateral swinging, means serving as a bell-crank pivoted adjacent the other end of the link, said crank having a depending arm pivoted to the implement and a second arm extending above the pivotal connection of the crank to the link, and an extension spring connecting the said second arm to the link at a location spaced from the latter's connection to the crank.

6. Lift mechanism adapted for use with an agricultural implement connected to a tractor at its hitch point for lateral and vertical swinging movement, comprising a rockable structure on the tractor, means deriving power from the tractor to rock the rockable structure and lifting means connecting the rockable structure and the implement to raise the latter to transport position on the tractor comprising a lever pivoted on the implement a link connecting the lever to the said rockable structure for movement therewith, an arm secured to the lever having a portion extending above the pivotal connection of the lever to the link and a portion extending therebelow, an extension spring connecting the arm to the link at a location medially of its ends, and a pair of toggle links connecting the lower portion of the arm to the link medially of its ends.

7. Lift mechanism adapted for use with an agricultural implement connected to a tractor at its hitch point for lateral and vertical swinging movement, comprising a rockable structure on the tractor, means for rocking the rockable structure, means connecting the rockable structure to the implement at a location spaced from said hitch point to move the implement between operating and transport positions, comprising means serving as a bell-crank pivoted to the rockable structure and having arms extending above and below said pivotal connection, means pivotally connecting the lower arm to the implement, extensible resilient means connecting the upper arm to the rockable structure at a location removed from the connection of the crank thereto to accommodate relative vertical movement of the implement, said bell crank being so arranged that upward movement of the implement relative to the rockable structure rocks the crank in a direction to increase the tension upon the springs, and a connection between the lower arm and the rockable structure adapted to accommodate movement of the implement relative to the rockable structure and to become rigid upon rocking of the rockable structure to lift the implement.

8. Lift mechanism adapted for use with an agricultural implement connected to a tractor at its hitch point for lateral and vertical swinging movement, comprising a rockable structure on the tractor, means for rocking the rockable structure, means connecting the rockable structure to the implement at a location spaced from said hitch point to move the implement between operating and transport positions, comprising means serving as a bell-crank pivoted to the rockable structure and having arms extending above and below said pivotal connection, means pivotally connecting the lower arm to the implement, extensible resilient means connecting the upper arm to the rockable structure at a location removed from the connection of the crank thereto to accommodate relative vertical movement of the implement, said bell-crank being so arranged that upward movement of the implement relative to the rockable structure rocks the crank in a direction to increase the tension upon the springs, and stop means limiting rocking of the crank upon operation of the rockable structure to lift the implement.

JAMES MORKOSKI.

REFERENCES CITED

The following references are of record in the file of this patent:

UNITED STATES PATENTS

| Number | Name | Date |
| --- | --- | --- |
| 2,123,555 | Morkovski | July 12, 1938 |
| 2,298,499 | Morkovski | Oct. 13, 1942 |
| 2,324,870 | Orelind | July 20, 1943 |